(12) United States Patent
Tanaka et al.

(10) Patent No.: US 11,363,167 B2
(45) Date of Patent: Jun. 14, 2022

(54) IMAGE FORMING APPARATUS, METHOD FOR CONTROLLING IMAGE FORMING APPARATUS, AND STORAGE MEDIUM STORING COMPUTER PROGRAM

(71) Applicant: CANON KABUSHIKI KAISHA, Tokyo (JP)

(72) Inventors: Yasutomo Tanaka, Kashiwa (JP); Chiaki Numata, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 132 days.

(21) Appl. No.: 16/940,144

(22) Filed: Jul. 27, 2020

(65) Prior Publication Data
US 2021/0037163 A1     Feb. 4, 2021

(30) Foreign Application Priority Data

Jul. 31, 2019   (JP) .............................. JP2019-140820

(51) Int. Cl.
*H04N 1/40*   (2006.01)
*H04N 1/44*   (2006.01)
(Continued)

(52) U.S. Cl.
CPC .............. *H04N 1/442* (2013.01); *G06T 7/20* (2013.01); *G06V 40/166* (2022.01);
(Continued)

(58) Field of Classification Search
CPC .............. H04N 1/442; H04N 1/00498; H04N 1/00018; H04N 1/00015; H04N 1/00188;
(Continued)

(56) References Cited

U.S. PATENT DOCUMENTS 9,065,955 B2 *   6/2015   Baba ................... H04N 1/00323
9,747,537 B2 *   8/2017   Ono ........................ G06F 21/00
(Continued)

FOREIGN PATENT DOCUMENTS

CN     104427175 A     3/2015
CN     105227800     *   6/2015
(Continued)

OTHER PUBLICATIONS

Machine translation for JP 2017-146956 (Year: 2016).*
Machine translation for CN 105227800 (Year: 2015).*

*Primary Examiner* — Qian Yang
(74) *Attorney, Agent, or Firm* — Canon U.S.A., Inc. IP Division

(57) ABSTRACT

An image forming apparatus that includes an image capturing unit capturing an image in front of the apparatus; a display displaying a screen; and a controller including one or more processors, the controller configured to function as: an acquisition unit acquiring a face image of a user from the image captured by the image capturing unit; an authentication unit authenticating, using the face image of the user acquired by the acquisition unit, the user who is within a first distance from the apparatus; a tracking unit tracking the user authenticated by the authentication unit; and a control unit causing the display to display a screen that is based on information corresponding to the user tracked by the tracking unit when the user has reached a position at a second distance from the apparatus, the second distance being shorter than the first distance.

16 Claims, 12 Drawing Sheets

(51) Int. Cl.
*G06T 7/20* (2017.01)
*H04N 1/00* (2006.01)
*G06V 40/50* (2022.01)
*G06V 40/16* (2022.01)

(52) U.S. Cl.
CPC ............ *G06V 40/172* (2022.01); *G06V 40/50* (2022.01); *H04N 1/00498* (2013.01); *G06T 2207/30201* (2013.01)

(58) Field of Classification Search
CPC ............ G06T 7/20; G06T 2207/30201; G06V 40/166; G06V 40/172; G06V 40/50; G06V 10/62; G06V 20/52; G06V 40/161; G06F 21/32
See application file for complete search history.

(56) References Cited

U.S. PATENT DOCUMENTS

| | | | |
|---|---|---|---|
| 10,178,255 B2 * | 1/2019 | Nobutani | H04N 1/00395 |
| 10,489,097 B2 * | 11/2019 | Nobutani | H04N 1/0035 |
| 2013/0258424 A1 * | 10/2013 | Ono | H04N 1/00323 |
| | | | 358/475 |
| 2018/0232513 A1 | 8/2018 | Feezell et al. | |

FOREIGN PATENT DOCUMENTS

| | | | |
|---|---|---|---|
| CN | 106412357 A | | 2/2017 |
| JP | 2017-146956 | * | 2/2016 |
| JP | 2019057036 A | | 4/2019 |

* cited by examiner

DISTANCE D1

DISTANCE D2

TO FIG. 8B

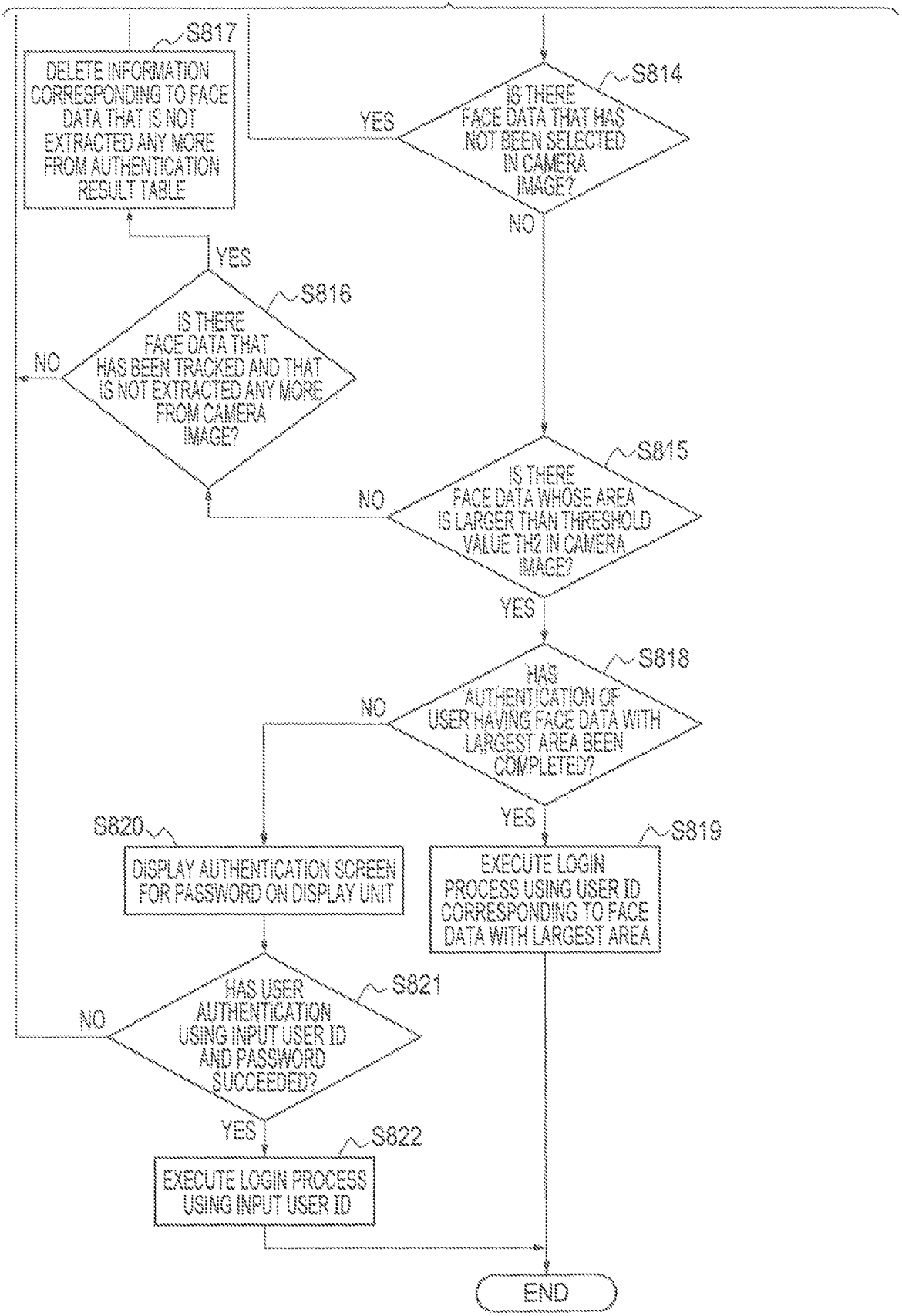

IMAGE FORMING APPARATUS, METHOD FOR CONTROLLING IMAGE FORMING APPARATUS, AND STORAGE MEDIUM STORING COMPUTER PROGRAM

BACKGROUND OF THE INVENTION

Field of the Invention

The present disclosure relates to an image forming apparatus, a method for controlling the image forming apparatus, and a storage medium storing a computer program.

Description of the Related Art

It has been known that, in an image forming apparatus having a copy function, a print function, and the like, a user inputs a user ID and a password, and an authentication process is performed using the input user ID and password. In the image forming apparatus, when a user logs in to the image forming apparatus after user authentication has been performed, a screen for printing a job of the logged-in user or a screen customized for the logged-in user is displayed. Various authentication methods are used for user authentication, such as authentication using an IC card or face authentication, as well as authentication using a user ID and a password.

Japanese Patent Application Laid-Open No. 2019-57036 describes an authentication process for an image forming apparatus that is based on face authentication using an image captured by a camera. User authentication based on face authentication takes some time. Thus, if image capturing and an authentication process are started when a user approaches the front of the image forming apparatus, the user is unable to operate the image forming apparatus until the authentication process is completed in front of the image forming apparatus. Accordingly, in the image forming apparatus described in Japanese Patent Application Laid-Open No. 2019-57036, face authentication is performed using an image captured when a user enters a predetermined region. Thus, the user is able to complete user authentication when the user reaches in front of the image forming apparatus without inputting a user ID and a password.

In Japanese Patent Application Laid-Open No. 2019-57036, user authentication is started when a user is at a certain distance away from the image forming apparatus so that the user authentication is completed when the user approaches the front of the image forming apparatus. Thus, there is a time lag from when the user authentication is started to when the user actually reaches the image forming apparatus. It is assumed that, at this time, the image forming apparatus displays a screen using information corresponding to the authenticated user immediately after the user authentication is competed. In this case, if another user approaches the front of the image forming apparatus before the authenticated user, the screen based on the information corresponding to the authenticated user may be shown to the other user.

SUMMARY OF THE INVENTION

An image forming apparatus according to an embodiment of the present disclosure includes an image capturing unit configured to capture an image in front of the image forming apparatus; a display configured to display a screen; and a controller including one or more processors, the controller being configured to function as: an acquisition unit configured to acquire a face image of a user from the image captured by the image capturing unit; an authentication unit configured to authenticate, using the face image of the user acquired by the acquisition unit, the user who is within a first distance from the image forming apparatus; a tracking unit configured to track the user authenticated by the authentication unit; and a control unit configured to cause the display to display a screen that is based on information corresponding to the user tracked by the tracking unit when the user has reached a position at a second distance from the image forming apparatus, the second distance being shorter than the first distance.

Further features of the present disclosure will become apparent from the following description of exemplary embodiments with reference to the attached drawings.

BRIEF DESCRIPTION OF THE DRAWINGS

FIGS. 8A and 8B illustrate a flowchart for describing a face authentication process according to the present embodiment.

DESCRIPTION OF THE EMBODIMENTS

Hereinafter, an embodiment for carrying out the present disclosure will be described in detail by example with reference to the drawings. Note that the components described in the present embodiment are merely examples and the scope of the present disclosure is not limited to these components.

<External Appearance of Image Forming Apparatus>

Figure 1:
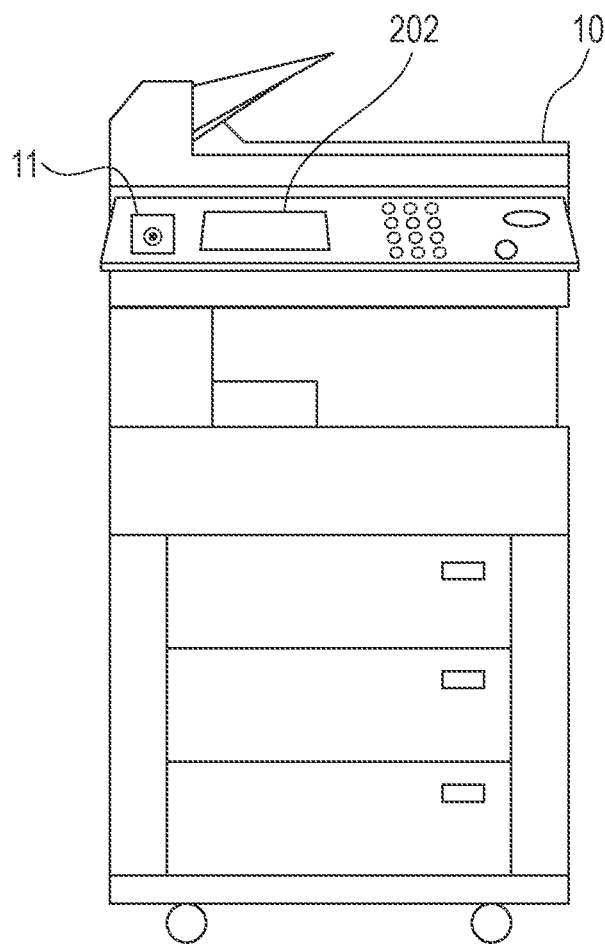
FIG. 1 is a diagram illustrating an example of an external appearance of an image forming apparatus according to a present embodiment.

FIG. 1 illustrates an external appearance of an image forming apparatus 10 according to the present embodiment. The image forming apparatus 10 has a plurality of functions, such as a print function, a scan function, a copy function, and a FAX function. The image forming apparatus 10 includes a camera unit 11. The camera unit 11 is oriented toward the front of the image forming apparatus 10.

The camera unit 11 functions as an image capturing unit that captures an image in front of the image forming apparatus 10. The camera unit 11 captures an image under control by a main controller of the image forming apparatus 10.

The image forming apparatus 10 captures, using the camera unit 11, an image of a user approaching the image forming apparatus 10, and performs face authentication. In a case where a face authentication result satisfies a predetermined condition, the image forming apparatus 10 allows the user to automatically log in to the image forming apparatus 10. In the following description, an image captured by the camera unit 11 will be referred to as a camera image.

<Image Capturing Range and Manned Operation Range>

First, a description will be given of regions in which extraction of a face image or face authentication with a face image can be performed using the camera unit 11, with reference to FIG. 2 and FIG. 3.

Figure 2:
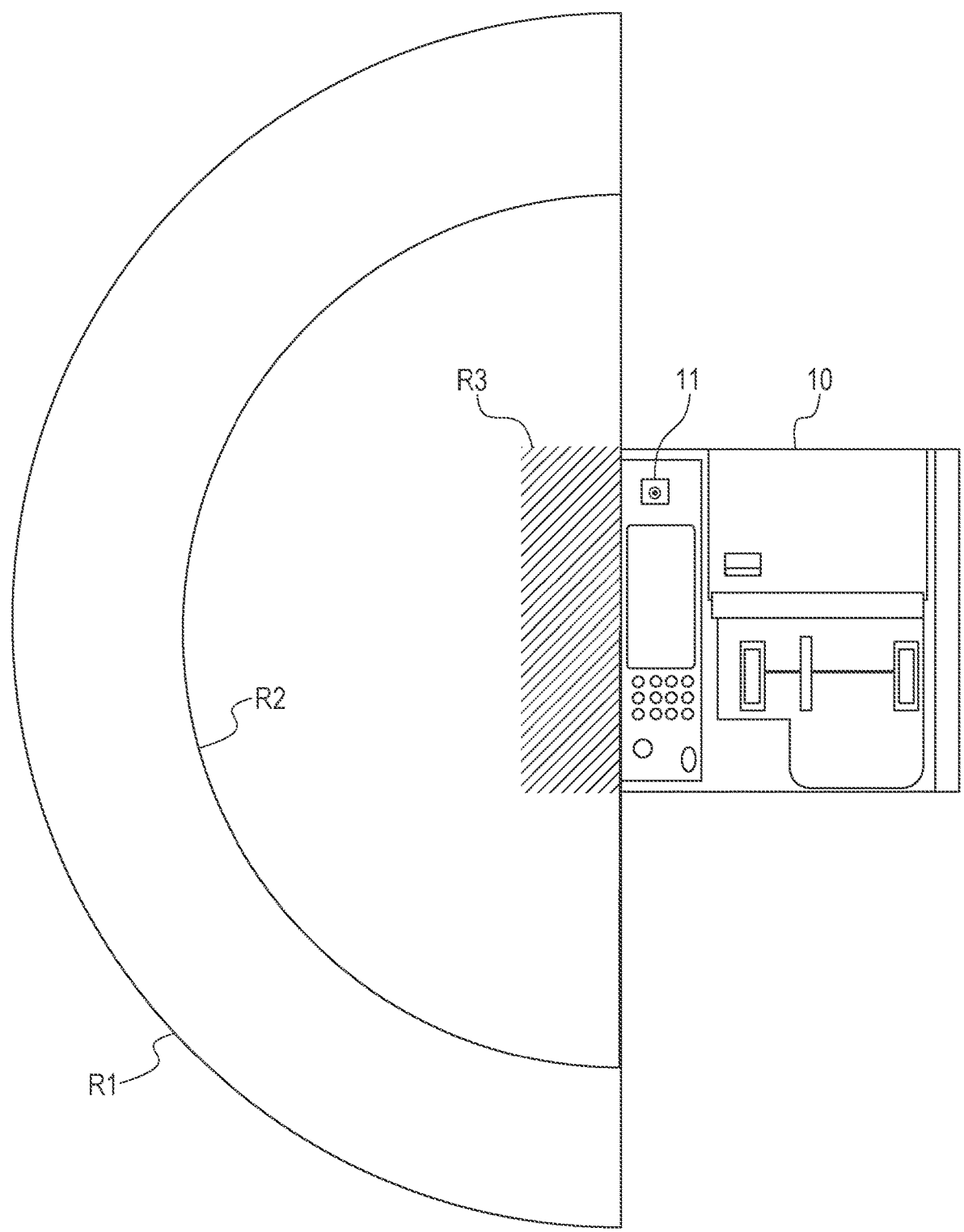
FIG. 2 is a schematic diagram illustrating a region in which face data can be acquired from a camera image captured by a camera unit of the image forming apparatus, and a region in which face authentication can be performed according to the present embodiment.

FIG. 2 is a diagram illustrating a region in which a face image can be extracted from an image captured by the camera unit 11 of the image forming apparatus 10, and a region in which face authentication based on the extracted face image can be performed. FIG. 2 illustrates the image forming apparatus 10 and the surroundings thereof viewed from above in the height direction of the image forming apparatus 10.

Figure 3:
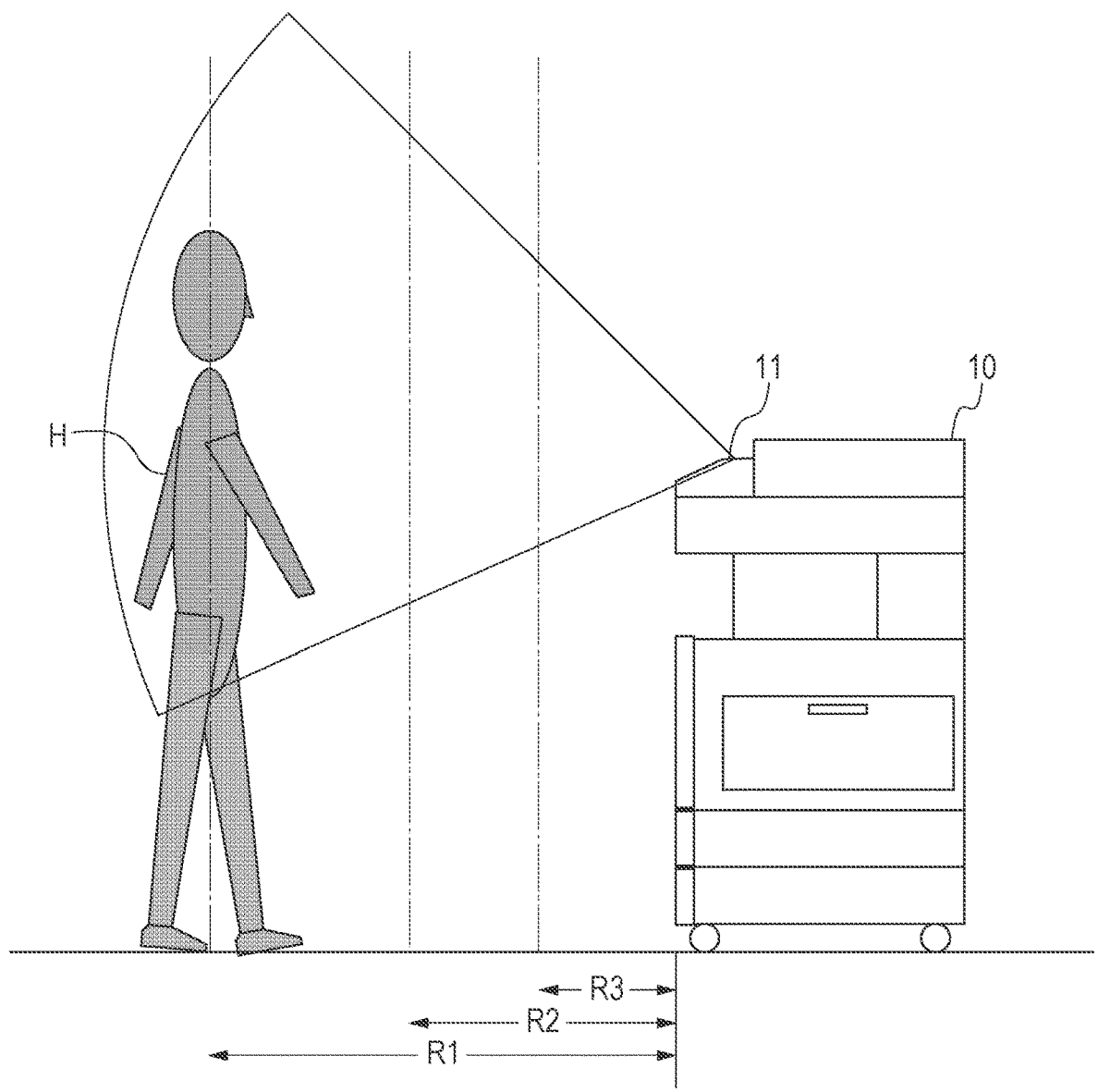
FIG. 3 is a side view of the image forming apparatus according to the present embodiment.

FIG. 3 is a side view for describing a range in which image capturing by the camera unit 11 of the image forming apparatus 10 is possible, and a range related to authentication. FIG. 3 illustrates the image forming apparatus 10 and the surroundings thereof viewed from a side of the image forming apparatus 10. A person H in FIG. 3 is a user to be authenticated by the image forming apparatus 10.

In FIG. 2, a region R1 is a region in which a face image can be extracted from an image captured by the camera unit 11. The region R1 has a fan-shape whose central angle is set to about 180 degrees when the image forming apparatus 10 is viewed from above in the height direction. The image forming apparatus 10 is capable of extracting a face image of a user who is inside the region R1.

A region R2 is a region in which face authentication using a face image included in an image captured by the camera unit 11 can be performed. The region R2 has a fan-shape whose central angle is set to about 180 degrees when the image forming apparatus 10 is viewed from above in the height direction, and has a fan-shape smaller than the region R1.

A region R3 is a region in which a user who operates the image forming apparatus 10 is detected. The region R3 is formed in front of the image forming apparatus 10 and has a rectangular-shape when viewed from above in the height direction. In this example, the length in the width direction of the rectangular range is equal to the length in the width direction of the image forming apparatus 10. The entire region R3 is located inside the region R1 and the region R2. The region R3 is a range in which a user is able to check and operate a display unit 202.

In the present embodiment, it is determined in which of the regions R1, R2, and R3 a user is present on the basis of a face image extracted from an image captured by the camera unit 11. A detailed detection method for determining the region in which the person H is present will be described below with reference to FIG. 6A to FIG. 6C.

The central angle of each of the regions R1 and R2 may be degrees other than about 180 degrees.

As illustrated in FIG. 3, the camera unit 11 is disposed, for example, beside the display unit 202 of the image forming apparatus 10 in an orientation of capable of capturing a face image of a user.

The image forming apparatus 10 according to the present embodiment performs authentication for permitting use of the image forming apparatus 10 by using a camera image acquired by capturing an image of the face of the person H approaching the image forming apparatus 10 by using the camera unit 11, as will be described below.

<Block Diagram of Image Forming Apparatus>

Figure 4:
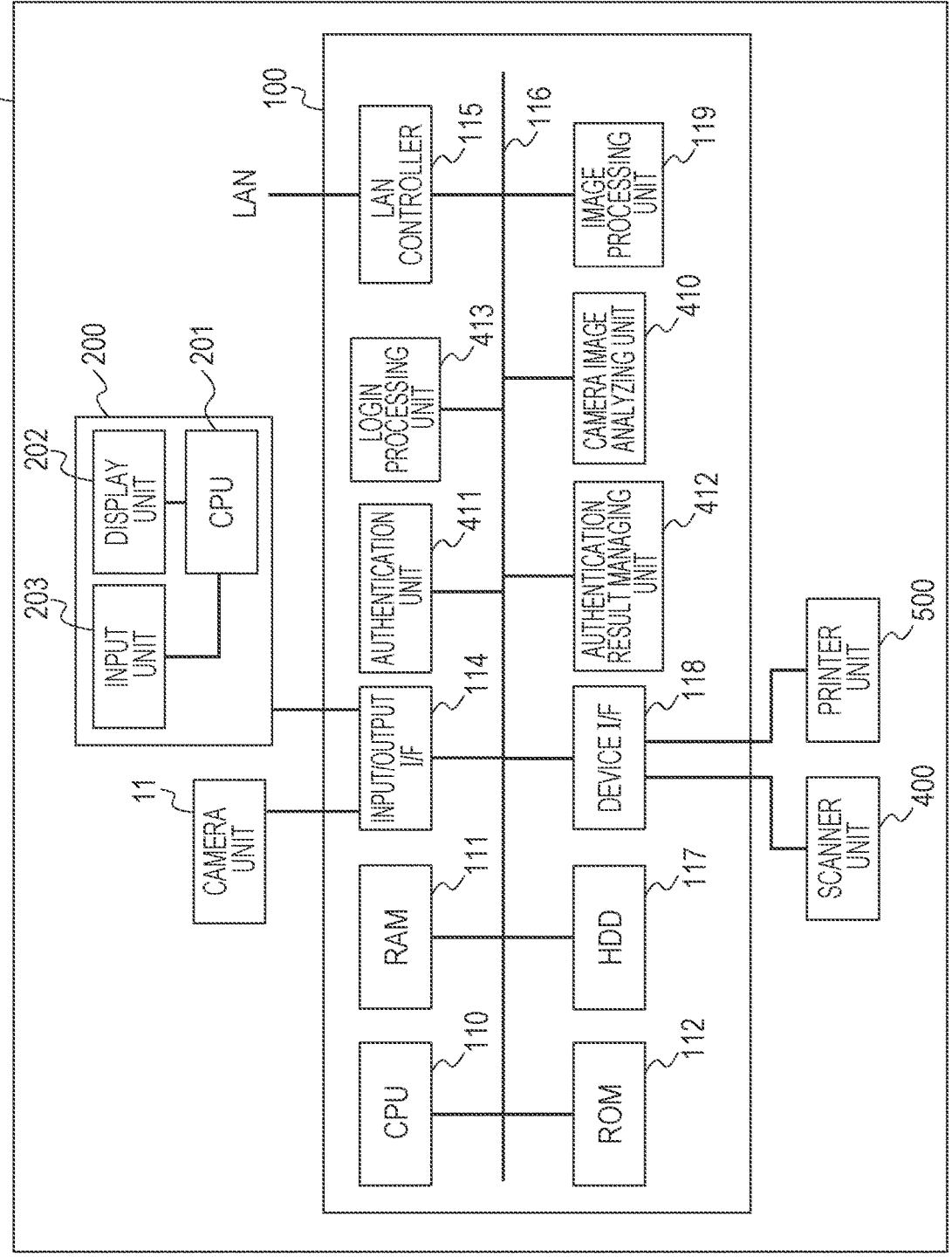
FIG. 4 is a hardware block diagram illustrating the configuration of the image forming apparatus according to the present embodiment.

FIG. 4 is a block diagram illustrating the configuration of the image forming apparatus 10 according to an embodiment of the present disclosure.

The image forming apparatus 10 includes a controller 100 that controls operations of the image forming apparatus 10, an operation unit 200, a scanner unit 400, and a printer unit 500.

The controller 100 is capable of communicating with the operation unit 200, the scanner unit 400, and the printer unit 500. The controller 100 includes a central processing unit (CPU) 110, a random access memory (RAM) 111, a read only memory (ROM) 112, an input/output interface (I/F) 114, and a local area network (LAN) controller 115, which are connected to a system bus 116. In addition, the controller 100 includes a hard disk drive (HDD) 117, a device I/F 118, and an image processing unit 119, which are connected to the system bus 116. Furthermore, the controller 100 includes a camera image analyzing unit 410, an authentication unit 411, and an authentication result managing unit 412, which are connected to the system bus 116.

The CPU 110 centrally controls the access to various devices that are in connection on the basis of a control program or the like stored in the ROM 112, and also centrally controls various processes executed by the controller 100. The CPU 110 communicates with the operation unit 200 and the camera unit 11 via the input/output I/F 114. In addition, the CPU 110 communicates with the scanner unit 400 and the printer unit 500 via the device I/F 118. The RAM 111 is a system work memory for the CPU 110 to operate and is a memory for temporarily storing image data. In the present embodiment, the CPU 110 communicates with the camera unit 11 and controls image capturing by the camera unit 11.

The ROM 112 stores various programs, such as a boot program for an apparatus.

The LAN controller 115 transmits information to or receives information from a personal computer (PC) connected to a LAN and not illustrated, or an external apparatus such as an external authentication server.

The HDD 117 is a hard disk drive and stores system software and image data.

The image processing unit 119 is for performing image processing involved in reading or printing of a document. The image processing unit 119 reads out image data stored in the RAM 111 and performs image processing such as compression or decompression according to Joint Photographic Experts Group (JPEG), Joint Bi-level Image Experts Group (JBIG), or the like, and color adjustment.

The operation unit 200 is used by a user to control the image forming apparatus 10, and performs input and output of information between the image forming apparatus 10 and the user. In addition, the operation unit 200 includes an operation unit CPU 201, the display unit 202 constituted by a liquid crystal display (LCD), a light emitting diode (LED), or the like, and an input unit 203 constituted by a touch screen, a hardware key, or the like. Furthermore, the operation unit 200 may include an interface for transmitting data to or receiving data from a mobile terminal carried by the user, such as a near field communication (NFC) reader/Writer or a Bluetooth (registered trademark) module.

The scanner unit 400 is an image input device that optically reads an image from a document to generate image data.

The printer unit 500 is an image output device that forms an image on a recording medium (sheet) in accordance with an electrophotographic method.

The camera unit 11 has a function of capturing an image in front of the image forming apparatus 10 as described above. An image of a user approaching the image forming apparatus 10 is captured using the camera unit 11.

The camera image analyzing unit 410 is a module for analyzing a camera image captured by the camera unit 11. The camera image analyzing unit 410 has a function of detecting the face of a person included in the camera image and tracking the detected face of the person. In addition, the camera image analyzing unit 410 has a function of transmitting to the authenticating unit 411 an image of a face region of a person extracted from the camera image. The image acquired by extracting the face region of the person included in the camera image will be hereinafter referred to as "face data". Hereinafter, face detection, face tracking, and cutting out of a face region performed by the camera image analyzing unit 410 will be described by example with reference to FIG. 5.

Figure 5:
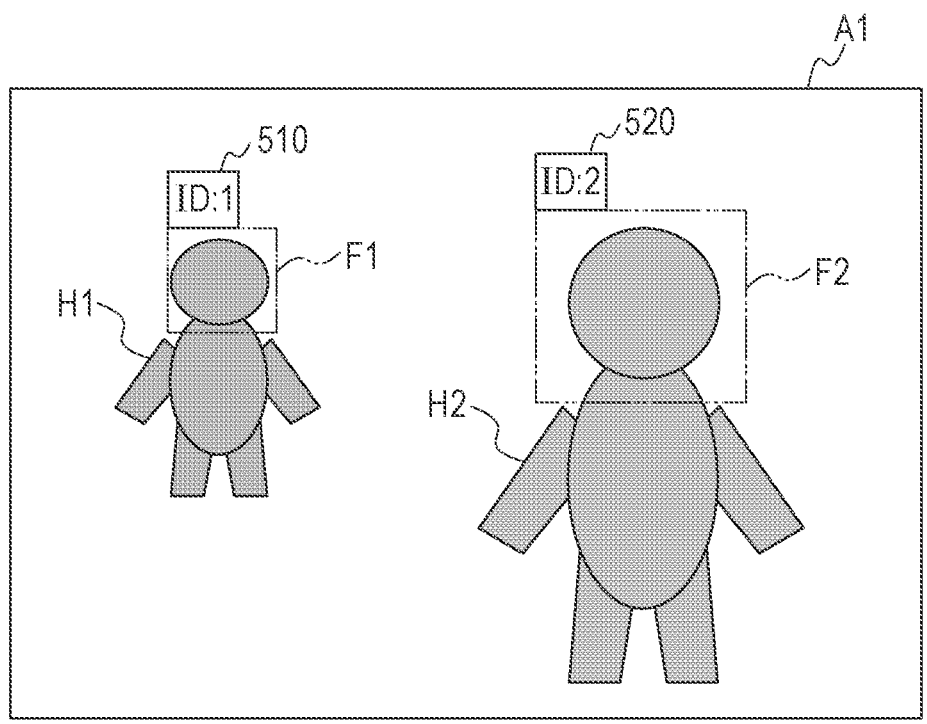
FIG. 5 is a schematic diagram illustrating a camera image captured by the camera unit and analysis by a camera image analyzing unit according to the present embodiment.

FIG. 5 is an explanatory diagram for describing the functions of detecting a face of a person included in a camera image, tracking the face of the person, and cutting out a face region of the person, of the camera image analyzing unit 410 according to the present embodiment.

In FIG. 5, A1 denotes a camera image acquired by the camera unit 11. The camera image A1 includes two persons, a person H1 and a person H2.

The camera image analyzing unit 410 receives the camera image A1 from the camera unit 11 and extracts face data F1 and face data F2 of the persons H1 and H2 from the camera image A1. The camera image analyzing unit 410 determines, using a method described below, whether or not it is possible to perform face authentication using the extracted face images. In a case where the camera image analyzing unit 410 determines that it is possible to perform face authentication using the face images, the camera image analyzing unit 410 transmits the face data F1 and the face data F2 to the authentication unit 411.

In addition, the camera image analyzing unit 410 assigns, to the detected two persons H1 and H2, an ID 510 and an ID 520 (hereinafter referred to as a tracking ID) for identifying the individuals, and tracks the detected persons H1 and H2. In the present embodiment, tracking of a person means a process of extracting the same user in a plurality of camera images acquired from the camera unit 11.

Regarding the face detection and tracking functions, open source OpenCV is generally known as libraries having image processing/analysis and machine learning functions. With use of these libraries, the functions of the camera image analyzing unit 410 are implemented.

The description returns to the block diagram illustrating the configuration of the image forming apparatus 10 in FIG. 4.

The authentication unit 411 receives the face data extracted by the camera image analyzing unit 410 and performs face authentication. After completing the face authentication, the authentication unit 411 transmits an authentication result to the camera image analyzing unit 410. The authentication unit 411 includes a face data managing unit (not illustrated) for managing pieces of face data of a plurality of users. The face data managing unit stores a face data management table for managing pieces of face data of a plurality of users, for example, as shown in Table 1. In Table 1, "User No." is a serial number of a user managed by the authentication unit 411. "User ID" is identification information for identifying the user. "Password" is a password used by the user to log in to the image forming apparatus 10. "Authentication face data" indicates the file name of face data used for face authentication by the authentication unit 411.

TABLE 1

| User No. | User ID | Password | Authentication face data |
|---|---|---|---|
| 0 | tanaka | xxxx | tanaka_facedata.jpg |
| 1 | yamada | yyyy | yamada_facedata.jpg |
| 2 | suzuki | zzzz | suzuki_facedata.jpg |

The authentication unit 411 receives a face authentication request, together with face data, from the camera image analyzing unit 410. The authentication unit 411 analyzes the face data, compares the received face data with the authentication face data stored in the face data managing unit, and determines whether the received face data matches the stored face data of any one of the users. In a case where the authentication unit 411 determines that the face data of the corresponding person is registered in the face data managing unit, the authentication unit 411 transmits to the authentication result managing unit 412 the user ID of the corresponding person and a notification indicating that authentication has been completed as a face authentication result. In a case where the authentication face data corresponding to the received face data is not registered in the face data managing unit, the authentication unit 411 transmits to the authentication result managing unit 412 a notification indicating that authentication has failed.

The authentication result managing unit 412 stores the authentication result acquired through the authentication by the authentication unit 411. The authentication result managing unit 412 stores the authentication result received from the authentication unit 411 in an authentication result table shown in Table 2.

TABLE 2

| Tracking ID | User ID |
|---|---|
| 0 | yamada |
| 1 | suzuki |
| 3 | unknown |

In the authentication result table, "Tracking ID" is identification information assigned to face data extracted by the camera image analyzing unit 410, "User ID" is a user ID of a user authenticated by the authentication unit 411 on the basis of the face data extracted by the camera image analyzing unit 410. In a case where authentication by the authentication unit 411 has not been performed, the authentication result managing unit 412 registers the tracking ID assigned by the camera image analyzing unit 410 and information indicating that authentication has not been competed in the authentication result table in association with each other. For example, in Table 2, a user who has not been authenticated is registered as "unknown". When the user having the face data of the tracking ID 3 approaches the image forming apparatus 10 and is authenticated, the user ID is updated from "unknown" to the user ID of the authenticated user. The case where authentication by the authentication unit 411 has not been performed is, for example, a case where the user is outside the region R2 and inside the region R1 in FIG. 2, a case where the user corresponding to the face data extracted by the camera image analyzing unit 410 is not registered in the face data managing unit, or the like.

In the present embodiment, a description is given under the assumption that the image forming apparatus 10 includes therein the authentication unit 411. Alternatively, the authentication unit 411 may be an authentication server outside the apparatus, connected via a LAN or the Internet.

A login processing unit 413 is a processing unit that executes a process for allowing a user authenticated by the authentication unit 411 to log in to the image forming apparatus 10. The login processing unit 413 reads out a login information table stored in the HDD 117 and displays a display screen corresponding to the authenticated user on the display unit 202.

Table 3 given below is an example of the login information table.

TABLE 3

| User No. | User ID | Language | Top screen | Copy default setting | Scan default setting | Color inversion of screen |
|---|---|---|---|---|---|---|
| 0 | tanaka | Japanese | Menu screen | Black & White, 50% magnification, 2 in 1 | — | 0 |
| 1 | yamada | English | Copy screen | Black & White | Color, 2-sided, 300 dpi*300 dpi | 0 |
| 2 | suzuki | Japanese | Scan screen | — | — | 1 |

As "User No.", a number common to the user No. in the face authentication data table managed by the authentication unit 411 is assigned. As "User ID", a user ID common to the user ID in the face authentication data table is stored. "Language" is a language used for displaying a screen on the display unit 202 when the user having the corresponding user No. and user ID has logged in. For example, when the user having a user ID "tanaka" has logged in, the display unit 202 displays a screen written in Japanese. On the other hand, when the user having a user ID "yamada" has logged in, the display unit 202 displays a screen written in English. "Top screen" indicates information of a screen displayed first after the user has logged in. The menu screen is a function selection screen as illustrated in FIG. 7B and is a screen displayed after login or when the user selects a home button that is not illustrated. The copy screen is a setting screen for the copy function as illustrated in FIG. 7C. On the copy screen, a plurality of setting items related to the copy function can be set. The scan screen is a setting screen for the scan function with which the user scans a document. On the scan screen, a plurality of setting items related to the scan function can be set.

"Copy default setting" indicates set values on the copy screen when the user opens the copy screen illustrated in FIG. 7C for the first time after login. The login information table stores, among the setting items related to copy, the set value of a setting item for which the setting has been changed from the default setting of the image forming apparatus 10 to a different value, "Scan default setting" indicates set values displayed when the scan screen is displayed for the first time after the user logs in to the image forming apparatus 10. Here, it is assumed that only a set value changed from the default value of the image forming apparatus 10 is stored in the login information table. "Color inversion of screen" indicates a set value about the color of a screen displayed on the display unit 202. A color inversion function is a function of displaying a white region of the screen in black and displaying a black region of the screen in white. "0" indicates that color inversion is not applied, whereas "1" indicates that color inversion is applied. In the present embodiment, the login information table is stored in the HDD 117 of the image forming apparatus 10. Alternatively, the login information table may be stored in another memory of the image forming apparatus 10 or a server connected to the image forming apparatus 10 via a network.

In the present embodiment, a description is given under the assumption that all the functions of detecting a face of a person from a camera image and tracking the face are implemented by the camera image analyzing unit 410 in the image forming apparatus 10. Alternatively, one or some of the functions may be implemented by the camera unit 11.

<Description About Distance Between Image Forming Apparatus and Person>

Next, a description will be given of a method for determining, using a camera image acquired by the camera unit 11, in which of the regions R1, R2, and R3 a user is present.

Figure 6A:
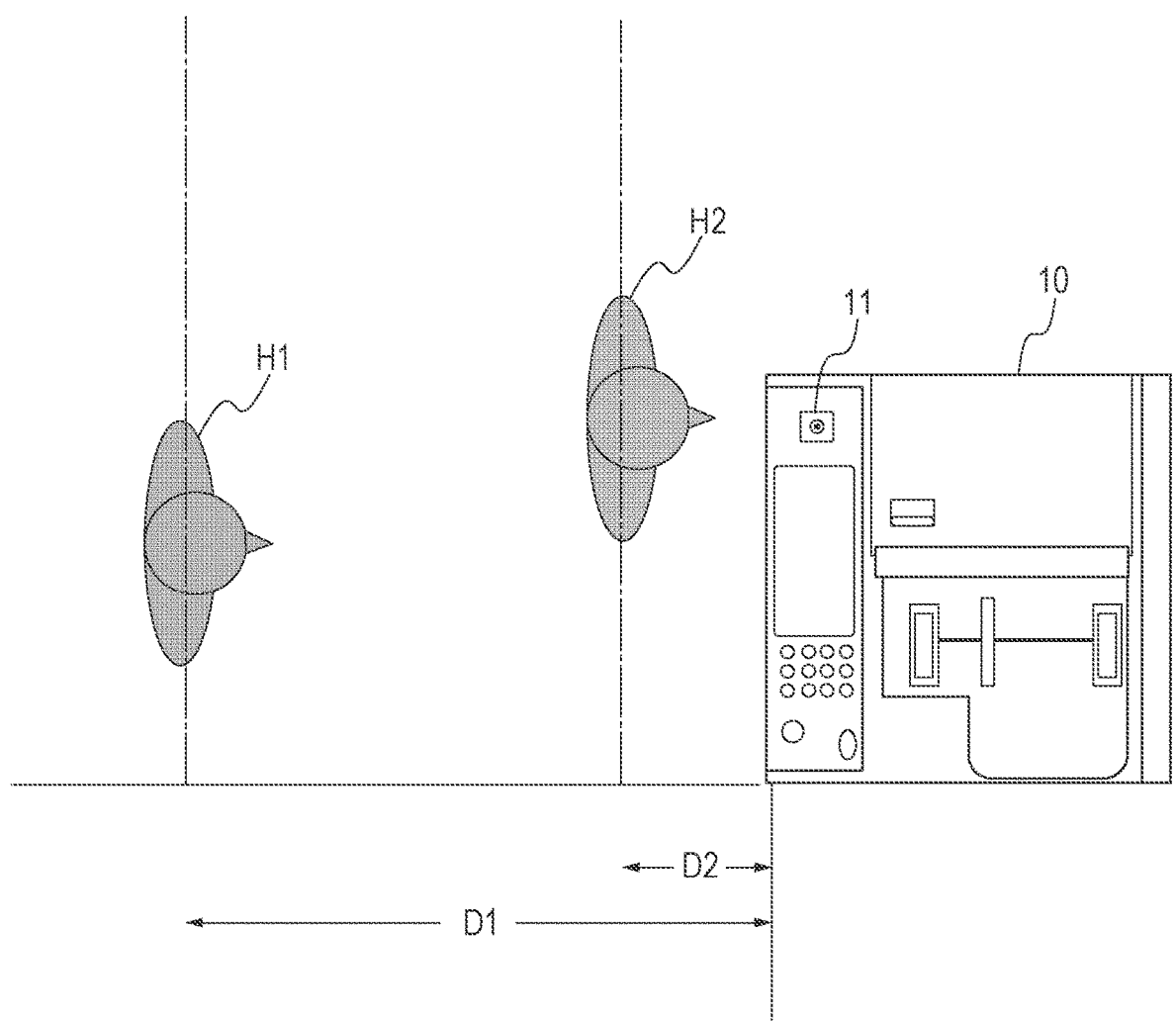
FIG. 6A is a schematic diagram illustrating a method for estimating, by the camera image analyzing unit, a region in which a user is present on the basis face data according to the present embodiment.

FIG. 6A is a top view of the image forming apparatus 10 in a case where the person H1 is at a distance D1 from the image forming apparatus 10 and the person H2 is at a distance D2 from the image forming apparatus 10. As illustrated in FIG. 6A, the person H2 is closer to the image forming apparatus 10 than the person H1. At this time, the image illustrated in FIG. 5 is captured by the camera unit 11.

Figure 6B:
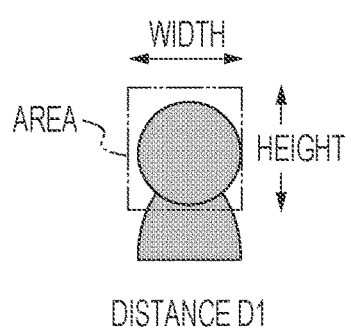
FIG. 6B is a schematic diagram illustrating face data of a user extracted from an image captured by the camera unit according to the present embodiment.
Figure 6C:
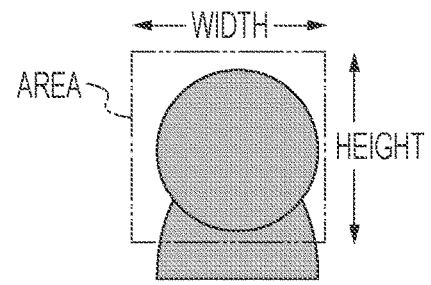
FIG. 6C is another schematic diagram illustrating face data of a user extracted from an image captured by the camera unit according to the present embodiment.

FIG. 6B illustrates the face data of the person H1 extracted from the image captured by the camera unit 11. The camera image analyzing unit 410 extracts a rectangle including a region of the face of the person H1 as face data. FIG. 6C illustrates the face data of the person H2 extracted from the image captured by the camera unit 11. The camera image analyzing unit 410 extracts a rectangle including a region of the face of the person H2 as face data. To acquire face data, a polygon including the entire region of a face in a camera image may be extracted. As can be understood from FIG. 6B and FIG. 6C, the size of face data increases as the distance to the user decreases. The CPU 110 of the image forming apparatus 10 calculates the area of the face data from the height and width of the face data extracted by the camera image analyzing unit 410. The CPU 110 compares the calculated area with a preset threshold value, thereby determining in which of the regions R1, R2, and R3 the user is present.

Of course, the method described above with reference to FIG. 6A to FIG. 6C regarding a method for determining the distance from the image forming apparatus 10 to a person is an example, and another method according to the related art may be used to detect the distance. For example, a distance detection method using a sensor capable of detecting a distance to an object, such as an ultrasonic sensor, or a distance detection method using an infrared array sensor or the like may be used in the present embodiment.

<Description of Screen Displayed on Display Unit>

Figure 7A:
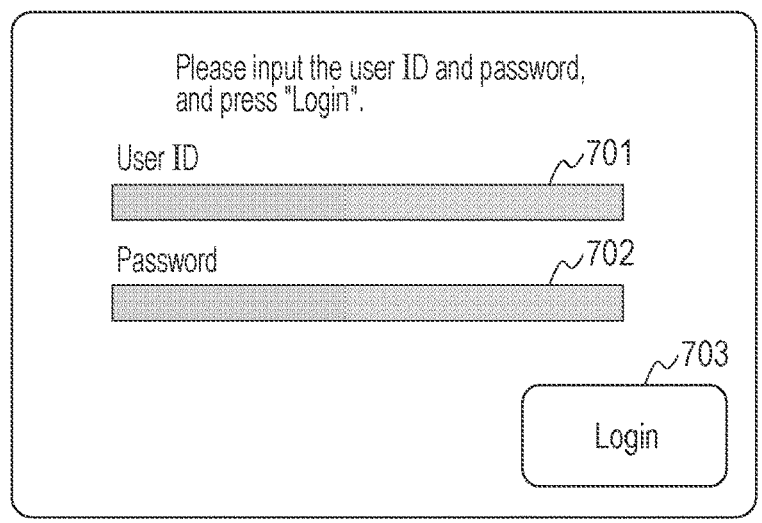
FIG. 7A is a diagram illustrating an example of a screen displayed on a display unit.
Figure 7B:
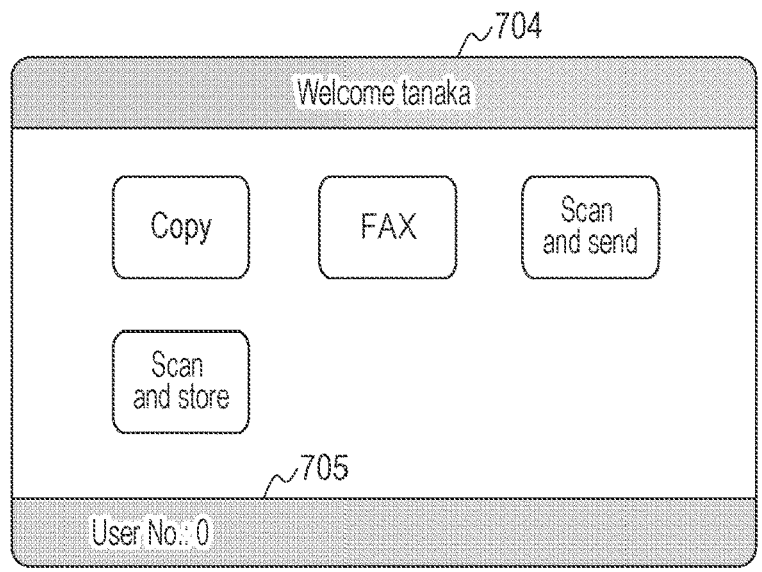
FIG. 7B is a diagram illustrating another example of a screen displayed on the display unit.
Figure 7C:
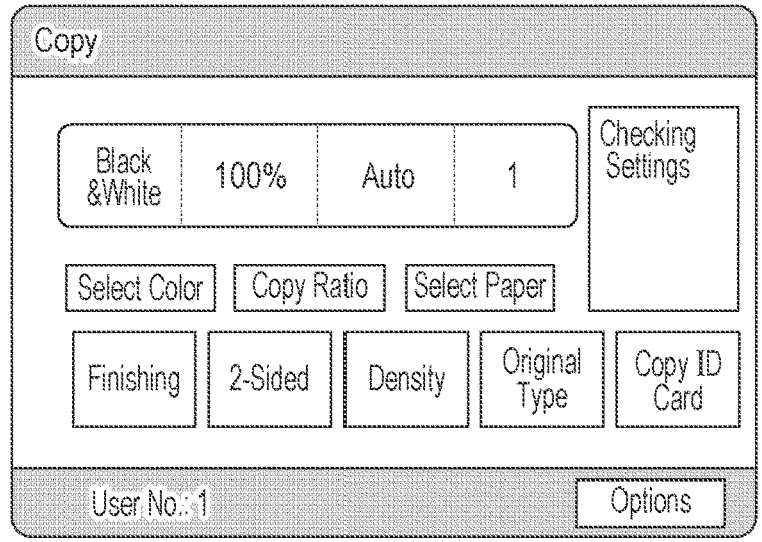
FIG. 7C is a diagram illustrating another example of a screen displayed on the display unit.

FIG. 7A to FIG. 7C illustrate examples of a screen displayed on the display unit 202 of the image forming apparatus 10. In the present embodiment, the image forming apparatus 10 prompts a user to perform password authentication when it is determined that the face data of the user for authentication has not been registered in a face authentication process by the authentication unit 411.

FIG. 7A illustrates an example of a screen for prompting a user to perform password authentication when the user approaches the image forming apparatus 10 and it is determined that the face image data of the user has not been registered in a face authentication process by the authentication unit 411. A region 701 is a region in which the user inputs a user ID. The user inputs the user ID shown in Table 1 in the region 701. A region 702 is a region in which the user inputs a password. The user inputs the password shown in Table 1. After inputting the user ID and the password, the user selects "Login" 703. Accordingly, an authentication process is performed by the authentication unit 411. This screen is effective in a case where it is not possible to perform authentication using face data of a user approaching the image forming apparatus 10, in a case where the user ID and the password are registered in Table 1 but authentication face data is not registered, or the like.

FIG. 7B and FIG. 7C illustrate screens that are displayed on the display unit 202 in a case where a user has completed authentication using face data when approaching the image forming apparatus 10 or in a case where the "Login" 703 has been selected on the screen illustrated in FIG. 7A and a login process has been completed. FIG. 7B illustrates a screen that is displayed in a case where the user whose user No. is 0 has logged in. FIG. 7C illustrates a screen that is displayed in a case where the user whose user No. is 1 has logged in.

The screen displayed on the display unit 202 after a user has been authenticated is a user-specific function selection screen corresponding to the user. The user ID of the logged-in user is displayed in a region 704, and the user No. of the logged-in user is displayed in a region 705. In the image forming apparatus 10, each user is able to customize the language used for displaying a screen, the type of the screen displayed immediately after login, and the number and types of buttons displayed on the function selection screen. For example, in a case where the user whose user No. is 1 has logged in, a copy setting screen written in English is displayed as illustrated in FIG. 7C when the user is within the region R3 or when the user selects the "Login" 703 on the screen illustrated in FIG. 7A. In this way, the image forming apparatus 10 is capable of displaying a screen suitable for each user.

<Flow of Face Authentication>

Figure 8A:
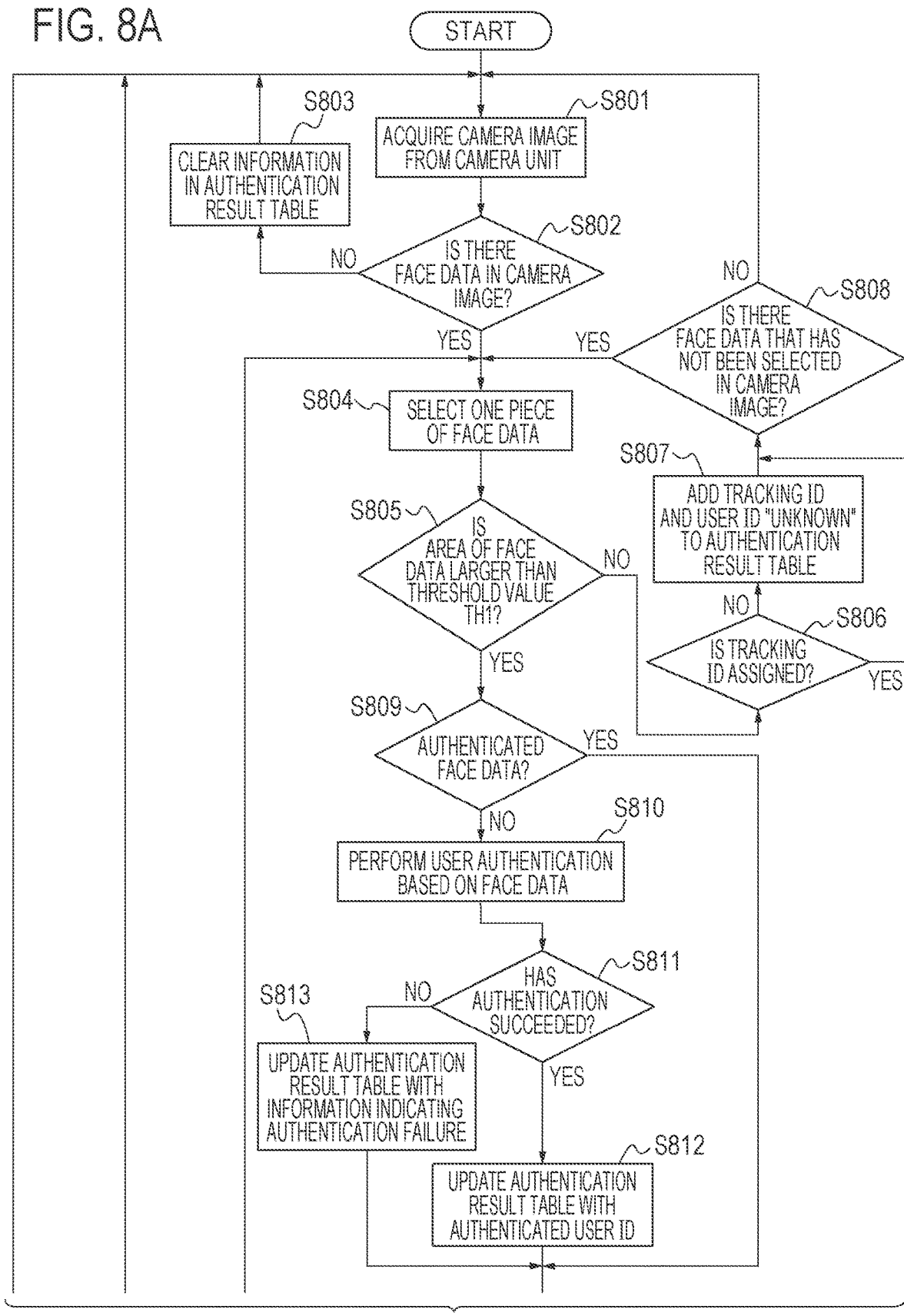

Next, a description will be given of the control of a face authentication process and screen display at the time of login, in the image forming apparatus 10 according to the present embodiment. FIGS. 8A and 8B illustrate a flowchart illustrating a process executed by the image forming apparatus 10 in a case where any user has not logged in. This process is implemented by loading a program corresponding to this process and stored in the ROM 112 to the RAM 111 and executing the program by the CPU 110. The process illustrated in FIGS. 8A and 8B is started after the power of the image forming apparatus 10 has been turned on. The process illustrated in FIGS. 8A and 8B is executed after the user has logged out from the image forming apparatus 10 as well as after the power of the image forming apparatus 10 has been turned on.

The CPU 110 transmits a camera image acquisition request to the camera unit 11 and acquires a camera image captured by the camera unit 11 (S801). The CPU 110 transmits a camera image acquisition request to the camera unit 11. The camera unit 11 acquires an image on the basis of the camera image acquisition request and transmits the acquired image to the CPU 110.

The CPU 110 determines whether or not there is face data in the camera image acquired in S801 (S802). The CPU 110 transmits the image acquired from the camera unit 11 to the camera image analyzing unit 410 and provides an instruction to extract face data from the camera image. The camera image analyzing unit 410 extracts face data from the camera image. The camera image analyzing unit 410 transmits to the CPU 110 information indicating whether or not face data has been extracted from the camera image. On the basis of the information from the camera image analyzing unit 410, the CPU 110 determines whether or not there is face data in the camera image. In a case where there is no face data in the camera image, the CPU 110 clears the authentication result table managed by the authentication unit 411 (S803), and returns to S801.

The CPU 110 selects one piece of face data from the camera image (S804). Subsequently, the CPU 110 determines whether or not the area of the selected piece of face data is larger than a threshold value TH1 (S805). The threshold value TH1 is a threshold value for determining whether or not the user is in the region R2. In a case where the area of the piece of face data is larger than the threshold value TH1, the CPU 110 determines that the user having the selected piece of face data is in the region R2, and the process proceeds to S809. In a case where the area of the piece of face data is smaller than or equal to the threshold value TH1, the size of the face data included in the camera image is too small to perform face authentication. Thus, the CPU 110 executes S806 and the subsequent steps.

The CPU 110 refers to the authentication result table managed by the authentication result managing unit 412 and determines whether or not a tracking ID is assigned to the user having the selected piece of face data (S806). In a case where a tracking ID is assigned, the CPU 110 proceeds to S808. In a case where a tracking ID is not assigned, the CPU 110 controls the camera image analyzing unit 410, assigns a tracking ID to the piece of face data, notifies the authentication result managing unit 412 of the assigned tracking ID, and registers the tracking ID in the authentication result table (S807). At this time, authentication using the piece of face data has not been completed, and thus the CPU 110 adds a record of a user ID "unknown" to the authentication result table.

The CPU 110 determines whether or not a piece of face data that has not been selected in S804 is included in the camera image (S808). In a case where all the pieces of face data included in the camera image have been selected, the CPU 110 returns to S801. In a case where there is a piece of face data that has not been selected is included in the camera image, the CPU 110 proceeds to S804. In the second or later S804 for a single camera image, the CPU 110 selects a piece of face data that has not been selected.

The CPU 110 determines whether or not the selected piece of face data is authenticated face data (S809). The CPU 110 controls the authentication result managing unit 412 and refers to the authentication result table. In a case where the user ID corresponding to the tracking ID assigned to the selected piece of face data is not "unknown" in the authentication result table, the CPU 110 determines that the piece of face data is authenticated face data. In a case where the selected piece of face data is authenticated face data, the CPU 110 proceeds to S814. As a result of determining in S809 whether or not the selected piece of face data is authenticated face data, it is possible to prevent a situation from occurring where authentication using the face data of an authenticated user is performed a plurality of times. Accordingly, the process load of the image forming apparatus 10 can be reduced and the time taken to authenticate pieces of face data of a plurality of people included in the camera image can be shortened.

In a case where the selected piece of face data is not authenticated face data, the CPU 110 performs user authentication by using the piece of face data (S810). In S810, the CPU 110 controls the camera image analyzing unit 410 to transmit the piece of face data to the authentication unit 411. The authentication unit 411 performs face authentication by using the piece of face data received from the camera image analyzing unit 410 and information in the face data management table. In a case where the face authentication has succeeded, the CPU 110 receives from the authentication unit 411 the user ID of the authenticated user as a result of the face authentication. In a case where the face authentication has failed, the CPU 110 receives from the authentication unit 411 a notification indicating that the face authentication has failed.

On the basis of the information received from the authentication unit 411, the CPU 110 determines whether or not the face authentication has succeeded (S811). In a case where the authentication has succeeded, the CPU 110 controls the authentication result managing unit 412 to update the user ID corresponding to the tracking ID of the piece of face data in the authentication result table to the user ID of the authenticated user (S812). On the other hand, in a case where the authentication has failed, the CPU 110 controls the authentication result managing unit 412 to update the user ID corresponding to the tracking ID of the piece of face data in the authentication result table to information indicating that the authentication has failed (S813). For example, in a case where the authentication has failed, the CPU 110 sets the user ID corresponding to the tracking ID of the piece of face data used for the face authentication to "failure". Accordingly, the CPU 110 is capable of identifying the user for which an authentication process has been performed but failed, with reference to the authentication result table.

The CPU 110 determines whether or not there is a piece of face data that has not been selected in the camera image (S814). In a case where there is a piece of face data that has not been selected, the CPU 110 returns to S804.

In a case where all the pieces of face data included in the camera image have been selected, the CPU 110 proceeds to S815.

The CPU 110 determines whether or not there is a piece of face data whose area is larger than a threshold value TH2 among the pieces of face data included in the camera image (S815). The threshold value TH2 is a threshold value for determining whether or not a user is present in the region R3. In a case where there is a piece of face data whose area is larger than the threshold value TH2 among the pieces of face data included in the camera image, the CPU 110 determines that a user is present in the region R3 and proceeds to S818.

In a case where the areas of all the pieces of face data included in the camera image are smaller than or equal to the threshold value TH2, the CPU 110 determines whether or not there is a piece of face data that has been tracked and that is not extracted any more from the camera image (S816). The CPU 110 controls the camera image analyzing unit 410 to determine whether or not there is a piece of face data to which a tracking ID has been assigned and that is not included in the face data extracted from the camera image. In S816, the CPU 110 determines whether or not there is a user who once entered the region R1 and went out of the region R1 without operating the image forming apparatus 10, for example, a user who passed near the image forming apparatus 10.

In a case where there is not a piece of face data to which a tracking ID has been assigned and that is not extracted any more from the camera image, the CPU 110 returns to S801. In a case where there is a piece of face data to which a tracking ID has been assigned and that is not extracted any more from the camera image, the CPU 110 deletes, from the authentication result table, the record of the tracking ID corresponding to the piece of face data that is not extracted any more (S817), and returns to S801.

In S815, in a case where there is a piece of face data having the largest area in the camera image, the CPU 110 determines whether or not the piece of face data having the largest area has been authenticated (S818). The CPU 110 controls the authentication result managing unit 412 to acquire the user ID corresponding to the tracking ID assigned to the piece of face data that has been determined to have the largest area. In a case where the acquired user ID is neither "unknown" nor "failure", the CPU 110 determines that authentication has been completed. On the other hand, in a case where the acquired user ID is "unknown" or "failure", the CPU 110 determines that authentication has not been completed.

In a case where authentication has been completed, the CPU 110 executes a login process by using the user ID corresponding to the tracking ID assigned to the piece of face data having the largest area (S819). Now, the login process for the image forming apparatus 10 will be described. The HDD 117 of the image forming apparatus 10 stores the login information table shown in Table 3. The login information table stores a user ID and information about a screen to be displayed upon login to the image forming apparatus 10 being performed by using the user ID in association with each other. The information about the screen includes, for example, a language used to display the screen, the type of the screen displayed first after login, set values of default settings of individual functions executed by the image forming apparatus 10, and the like. The CPU 110 specifies, from among the records stored in the login information table, a record of the user ID corresponding to the tracking ID assigned to the piece of face data having the largest area. Subsequently, the CPU 110 generates a screen on the basis of the setting information about the specified record and causes the display unit 202 to display the screen.

In a case where authentication has not been completed, the CPU 110 causes the display unit 202 to display the login screen illustrated in FIG. 7A (S820). After the login screen has been displayed, the CPU 110 receives input of a user ID and a password via the input unit 203. In response to input of the user ID and the password and selection of the "Login" 703 by the user, the CPU 110 transmits to the authentication unit 411 the user ID and the password that have been input to the login screen. The authentication unit 411 compares the user ID and the password that have been received from the CPU 110 with the face data table to perform a user authentication process. In a case where the authentication has succeeded, the authentication unit 411 transmits to the CPU 110 the user ID and a notification indicating that the user authentication has succeeded. In a case where the authentication has failed, the authentication unit 411 transmits to the CPU 110 a notification indicating that the authentication has failed. As a result of displaying the login screen, the user is allowed to log in to the image forming apparatus 10 even in a case where the user reaches in front of the image forming apparatus 10 before completion of user authentication based on face authentication or in a case where authentication using face data has failed. In the present embodiment, the same information as that for authentication using face data is used to perform authentication using the user ID and the password input on the login screen. Alternatively, authentication may be performed by using authentication data different from that for face authentication, or authentication may be performed by an external server by transmitting an input user ID and password to the external server. In addition, in S820, a user ID and a password are input via the login screen illustrated in FIG. 7A so as to perform authentication. The authentication in S820 is not limited to authentication based on the data input via the screen, and may be authentication using an IC card or authentication using biological information such as a fingerprint.

The CPU 110 determines whether or not user authentication using the input user ID and password has succeeded (S821). The CPU 110 determines whether or not the authentication has succeeded on the basis of the information received from the authentication unit 411.

In a case where the authentication has not succeeded, the CPU 110 returns to S801. In a case where the authentication has succeeded, the CPU 110 executes a login process on the basis of the login information table shown in Table 3 (S822). The CPU 110 specifies the record corresponding to the user ID of the authenticated user in the login information table. Subsequently, the CPU 110 generates a screen on the basis of the setting information in the specified record and displays the screen. Accordingly, the image forming apparatus 10 is capable of displaying the screen suitable for the user who has logged in.

<Specific Examples of Flow of Face Authentication>

Finally, a description will be given how the image forming apparatus 10 operates in a case where the face authentication process illustrated in FIGS. 8A and 8B has been executed, with reference to the schematic diagrams in FIG. 9 to FIG. 11.

Figure 9:
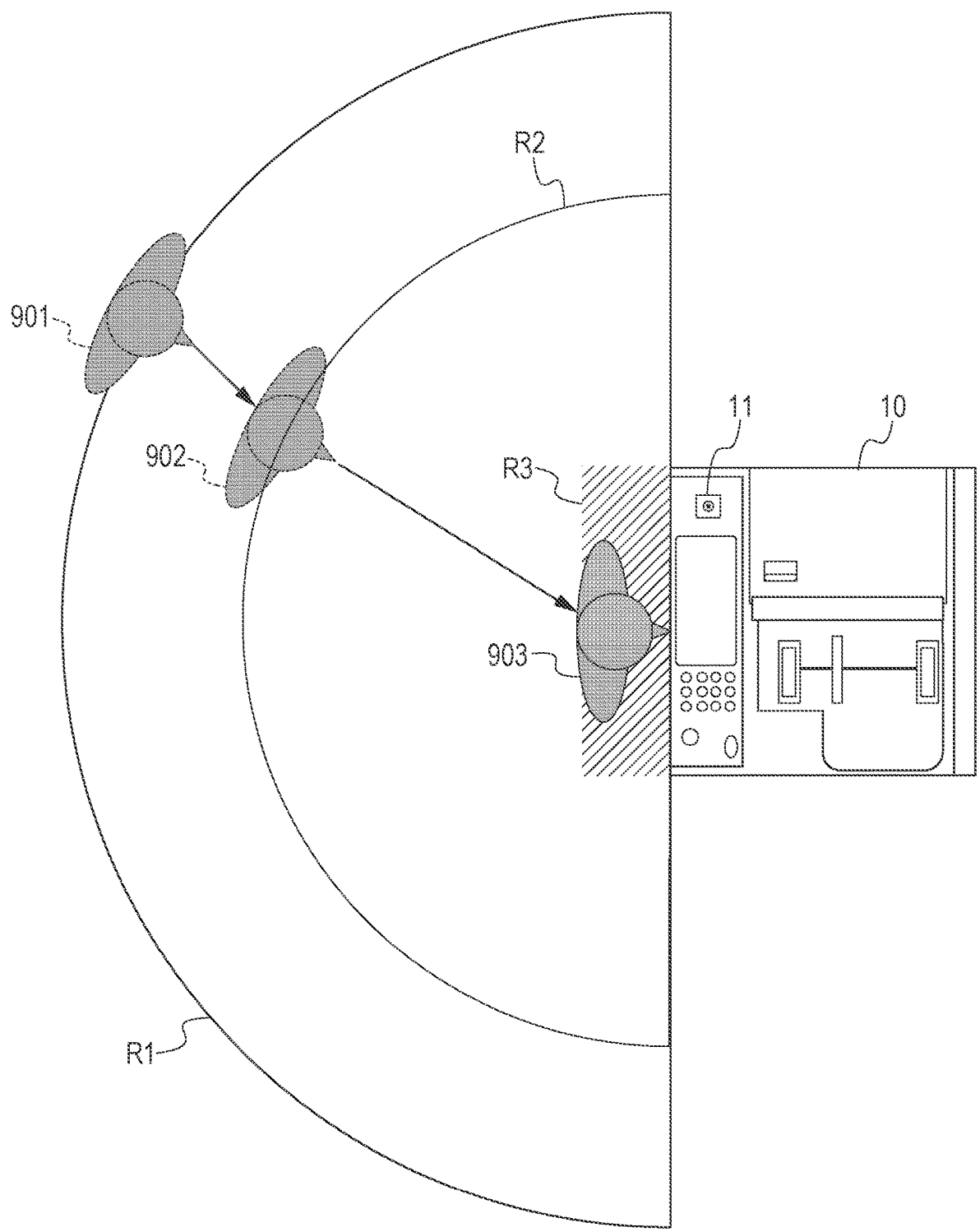
FIG. 9 is a schematic diagram for describing an operation of the image forming apparatus when a user approaches the image forming apparatus in the present embodiment.

FIG. 9 is a diagram illustrating a case where a user approaches the image forming apparatus 10 to use the image forming apparatus 10.

First, when the user approaches a position 901 and enters the region R1, the camera image analyzing unit 410 becomes capable of acquiring the face data of the user from a camera image captured by the camera unit 11. However, in this stage, the size of the face data extracted from the camera image is not sufficiently large and thus a face authentication process is not performed.

Subsequently, when the user approaches a position 902 and enters the region R2, the camera image analyzing unit 410 acquires face data from a camera image captured by the camera unit 11 and causes the authentication unit 411 to perform authentication. When the user reaches the region R3, the size of face data acquired from a camera image is sufficiently large for performing face authentication. After the authentication by the authentication unit 411 has been completed, the camera image analyzing unit 410 assigns a tracking ID to the face data, and thereafter tracks the face data every time the camera unit 11 captures an image. In addition, after the authentication has been completed, the authentication unit 411 registers an authentication result in the authentication result managing unit 412.

Subsequently, when the user approaches a position 903 and reaches the region R3, the CPU 110 acquires setting information by using the user ID corresponding to the tracking ID of the user who has reached the position 903 and displays a screen subsequent to the login screen on the display unit 202. As a result of completing the authentication process while the user is moving from the position 902 to the position 903, the screen subsequent to the login screen can be displayed without causing the user to wait after reaching the position 903.

Figure 10:
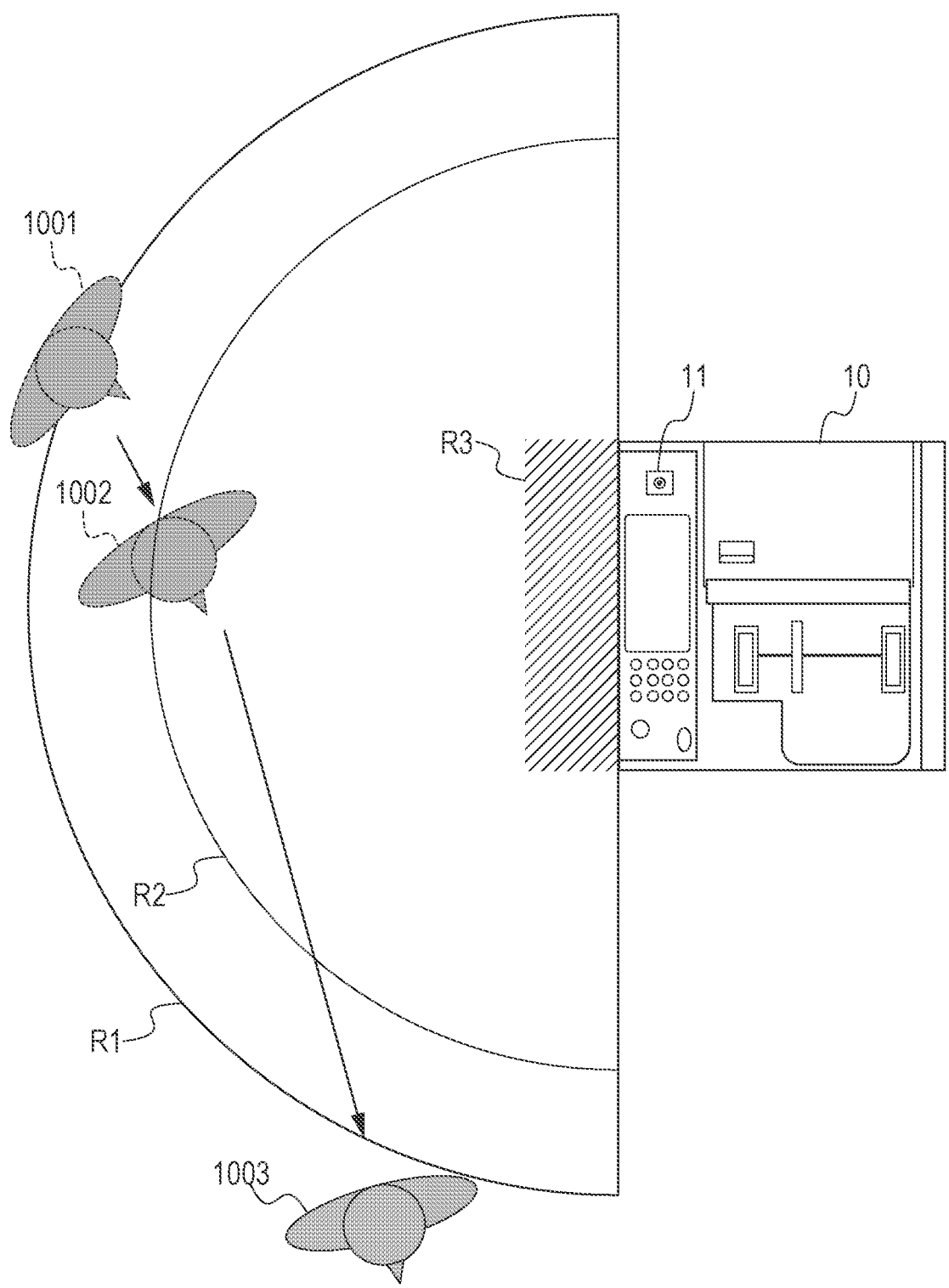
FIG. 10 is a schematic diagram for describing an operation of the image forming apparatus when a user cuts across in front of the image forming apparatus in the present embodiment.

FIG. 10 is a schematic diagram illustrating a case where a user cuts across in front of the image forming apparatus 10.

When the user approaches a position 1001 and reaches the region R1, the camera image analyzing unit 410 starts acquiring face data of the user from a camera image. As in FIG. 9, authentication using face data is not started in this stage.

After that, when the user moves to a position 1002 and reaches the region R2, the camera image analyzing unit 410 transmits to the authentication unit 411 face data acquired from a captured camera image. The authentication unit 411 performs authentication based on the face data acquired from the camera image analyzing unit 410. The authentication unit 411 stores an authentication result in the authentication result managing unit 412.

It is assumed that the user moves to a position 1003 without going to the region R3. At this time, the user moves to the outside of the region R1. The camera image analyzing unit 410 deletes the authentication result stored in the authentication result managing unit 412 when it becomes impossible to acquire the face data of the tracked user from a camera image acquired by the camera unit 11.

Figure 11:
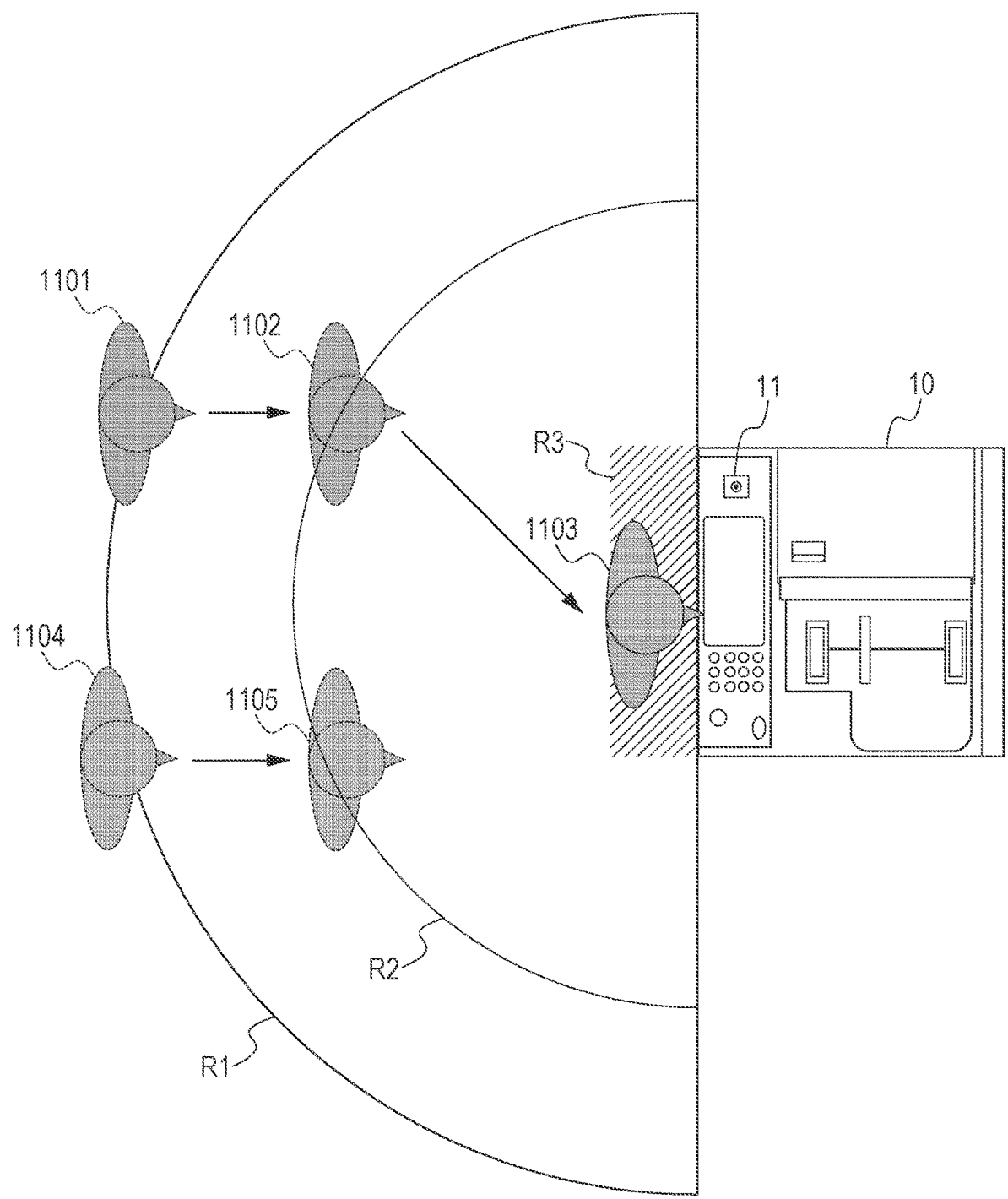
FIG. 11 is a schematic diagram for describing an operation of the image forming apparatus when a plurality of users approach the image forming apparatus in the present embodiment.

FIG. 11 illustrates a case where two users approach the region R3 and one of the two users enters the region R3 and uses the image forming apparatus 10.

First, when a user approaches a position 1101, the camera image analyzing unit 410 acquires the face data of the user at the position 1101 from a camera image acquired by the camera unit 11. At this time, it is not possible to perform face authentication of any user. The camera image analyzing unit 410 assigns a tracking ID to each of the two users. The authentication result managing unit 412 registers the tracking IDs assigned to the individual pieces of face data in the authentication result table.

When the user moves from the position 1101 to a position 1102 and enters the region R2, it becomes possible to perform authentication based on the face data acquired from a camera image captured by the camera unit 11.

The camera image analyzing unit 410 transmits the face data to the authentication unit 411. The authentication unit 411 performs a face authentication process by using the face data acquired from the camera image analyzing unit 410. The authentication result managing unit 412 registers the user ID of the user acquired as an authentication result of the authentication unit 411 and the tracking ID in the authentication result table in association with each other. Accordingly, the face authentication result for one of the two users has been acquired.

Subsequently, another user approaches a position 1104 before the user at the position 1102 reaches the region R3. At this time, the camera image analyzing unit 410 becomes capable of acquiring the face data of the user at the position 1104 from a camera image. The camera image analyzing unit 410 assigns a tracking ID to the acquired face data of the user at the position 1104 and registers the tracking ID in the authentication result managing unit 412. Accordingly, tracking of the user at the position 1104 is started. Furthermore, when the user at the position 1104 moves to a position 1105 and enters the region R2, the camera image analyzing unit 410 transmits the face data acquired from a camera image to the authentication unit 411. The authentication unit 411 performs face authentication by using the acquired face data of the user at the position 1105. The authentication result managing unit 412 registers the authentication result of the authentication unit 411 in the authentication result table. Accordingly, authentication of the two users at the position 1102 and the position 1105 is completed.

In this stage, it is not possible to determine which of the users at the position 1102 and the position 1105 will use the image forming apparatus 10. The image forming apparatus 10 uses the face data tracking function of the camera image analyzing unit 410 to determine the user who has entered the region R3 and determine that the user who has entered the region R3 is the user who uses the image forming apparatus 10.

When the user at the position 1102 moves to the position 1103, the camera image analyzing unit 410 determines, on the basis of the face data acquired from a camera image captured by the camera unit 11, that the user who has entered the region R3 is the user who has been tracked from the position 1102. The authentication result managing unit 412 acquires, from the camera image analyzing unit 410, the tracking ID assigned to the face data of the user who has reached the region R3. The authentication result managing unit 412 refers to the authentication result table to specify the user ID corresponding to the tracking ID acquired from the camera image analyzing unit 410, and executes a login process using the user ID.

As a result of the above-described operation of the image forming apparatus 10, an authentication process for a user can be completed when the user reaches the region R2, and only a login process is necessary when the user reaches the region R3. In the present embodiment, the login process is performed by using the user ID corresponding to the tracking ID of the user who has reached the region R3. Even in a case where pieces of face data of a plurality of users are acquired from a camera image captured by the camera unit 11, a screen corresponding to a user who has come in front of the image forming apparatus 10 can be displayed on the display unit 202. Accordingly, a situation can be prevented from occurring where a screen of another user whose face data is acquired from the camera image is displayed on the display unit 202.

As described above, according to the present embodiment, in the apparatus that performs face authentication by using face data acquired from a camera image captured by the camera unit 11, an authentication process can be performed more quickly than in a case where face authentication is performed when a user approaches the front of the image forming apparatus 10. In addition, even in a case where pieces of face data of a plurality of users are acquired from a camera image captured by the camera unit 11, a screen corresponding to a user who operates the image forming apparatus 10 can be displayed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to an embodiment of the present disclosure, it is possible to complete authentication of a user before the user approaches the front of an image forming apparatus and to prevent a situation from occurring where a screen based on information associated with the authenticated user is displayed before the user approaches the front of the image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-140820, filed Jul. 31, 2019, which is hereby incorporated by reference herein in its entirety.

What is claimed is:

1. An image forming apparatus comprising:
   an image capturing unit configured to capture an image in front of the image forming apparatus;
   a display configured to display a screen;
   a controller including one or more processors, the controller being configured to function as:
   an acquisition unit configured to acquire a face image of a user from the image captured by the image capturing unit;

an authentication unit configured to authenticate, using the face image of the user acquired by the acquisition unit, the user who is within a first distance from the image forming apparatus;

a tracking unit configured to track the user authenticated by the authentication unit; and a control unit configured to cause the display to display a screen that is based on information corresponding to the user tracked by the tracking unit when the user has reached a position at a second distance from the image forming apparatus, the second distance being shorter than the first distance.

2. The image forming apparatus according to claim 1, wherein the control unit causes the display to display the screen that is based on the information corresponding to the authenticated user when the user tracked by the tracking unit has reached the position at the second distance after authentication by the authentication unit has been completed.

3. The image forming apparatus according to claim 1, wherein the acquisition unit acquires a face image from a first image captured by the image capturing unit, the authentication unit performs authentication on the basis of the face image acquired by the acquisition unit, and the tracking unit tracks, in a second image captured after the first image by the image capturing unit, the user authenticated by the authentication unit.

4. The image forming apparatus according to claim 3, wherein the authentication unit performs authentication using the face image acquired from the first image and does not perform authentication using a face image acquired from the second image and corresponding to the authenticated user.

5. The image forming apparatus according to claim 1, wherein when a user who has not been authenticated by the authentication unit has reached the position at the second distance, the control unit causes the display to display a screen for receiving information for authenticating the user.

6. The image forming apparatus according to claim 1, wherein the authentication unit performs authentication using a face image that has been acquired by the acquisition unit and that has a size larger than a predetermined threshold value.

7. The image forming apparatus according to claim 6, wherein the control unit causes the display to display the screen that is based on the information corresponding to the user authenticated by the authentication unit, on the basis of a face image that has been acquired by the acquisition unit and that has a size larger than another predetermined threshold value.

8. The image forming apparatus according to claim 1, wherein the acquisition unit acquires a first face image and a second face image from the image captured by the image capturing unit, and the authentication unit authenticates the first face image and the second face image.

9. The image forming apparatus according to claim 1, wherein the control unit causes the display to display a screen that is based on information corresponding to a user who is within the second distance from the image forming apparatus and who is closest to the image forming apparatus.

10. The image forming apparatus according to claim 9, wherein the user who is closest to the image forming apparatus is a user whose face image acquired by the acquisition unit is largest.

11. The image forming apparatus according to claim 1, further comprising:

a storage unit configured to store identification information for identifying the user tracked by the tracking unit and an authentication result of the authentication unit for the tracked user in association with each other.

12. The image forming apparatus according to claim 11, wherein the storage unit stores data to be used for authentication of a face image by the authentication unit and the identification information for identifying the user in association with each other, and the authentication unit performs face authentication on the basis of the face image acquired by the acquisition unit and the data stored in the storage unit.

13. The image forming apparatus according to claim 1, wherein the control unit causes the display to display a screen written in a language that is stored in association with a first user who has reached the position at the second distance.

14. The image forming apparatus according to claim 1, wherein the acquisition unit acquires, as the face image, a polygon including a region specified as a face of a person from the image captured by the image capturing unit.

15. An image forming apparatus comprising:

an image capturing unit configured to capture an image in front of the image forming apparatus;

a display configured to display a screen;

a controller including one or more processors, the controller being configured to function as:

an acquisition unit configured to acquire a face image of a user from the image captured by the image capturing unit;

a reception unit configured to receive an authentication result of authentication performed using the face image of the user acquired by the acquisition unit, the user being within a first distance from the image forming apparatus;

a tracking unit configured to track the user for which the authentication result has been received by the reception unit; and a control unit configured to cause the display unit to display a screen that is based on information corresponding to the user tracked by the tracking unit when the user has reached a position at a second distance from the image forming apparatus.

16. A method for controlling an image forming apparatus including an image capturing unit configured to capture an image in front of the image forming apparatus, and a display unit configured to display a screen, the method comprising:

an acquisition step of acquiring a face image of a user from the image captured by the image capturing unit;

an authentication step of authenticating, using the face image of the user acquired in the acquisition step, the user who is within a first distance from the image forming apparatus;

a tracking step of tracking the user authenticated in the authentication step; and a control step of causing the display unit to display a screen that is based on information corresponding to the user tracked in the tracking step when the user has reached a position at a second distance from the image forming apparatus, the second distance being shorter than the first distance.

* * * * *